US010451220B2

(12) United States Patent
Lee (10) Patent No.: US 10,451,220 B2
(45) Date of Patent: Oct. 22, 2019

(54) FUEL GAS TANK FILLING SYSTEM AND METHOD (71) Applicant: Alternative Fuel Containers, LLC, Southfield, MI (US)

(72) Inventor: Joong-Kyu Lee, Chatham (CA)

(73) Assignee: Alternative Fuel Containers, LLC, Southfield, MI (US)

( * ) Notice: Subject to any disclaimer, the term of this patent is extended or adjusted under 35 U.S.C. 154(b) by 118 days.

(21) Appl. No.: 14/909,325

(22) PCT Filed: Aug. 2, 2014

(86) PCT No.: PCT/US2014/049505
§ 371 (c)(1),
(2) Date: Feb. 1, 2016

(87) PCT Pub. No.: WO2015/017843
PCT Pub. Date: Feb. 5, 2015

(65) Prior Publication Data
US 2016/0178126 A1  Jun. 23, 2016

Related U.S. Application Data
(60) Provisional application No. 61/861,467, filed on Aug. 2, 2013.

(51) Int. Cl.
*F17C 5/06* (2006.01)
*F17C 11/00* (2006.01)
(Continued)

(52) U.S. Cl.
CPC ............ *F17C 5/06* (2013.01); *B01D 46/2403* (2013.01); *B01D 46/4227* (2013.01);
(Continued)

(58) Field of Classification Search
CPC .......... F17C 5/06; F17C 5/007; F17C 11/005; F17C 11/007; F17C 13/00;
(Continued)

(56) References Cited

U.S. PATENT DOCUMENTS 2,070,013 A * 2/1937 Krannak ................. F16N 21/04
156/460
2,362,880 A * 11/1944 Campbell ............... F16N 21/04
184/105.1
(Continued)

FOREIGN PATENT DOCUMENTS

| EP | 1006310 A2 * | 6/2000 | ............... F17C 5/00 |
| EP | 1669663 A2 * | 6/2006 | ............. F17C 5/007 |
| JP | 2005069330 A | 3/2005 | |

OTHER PUBLICATIONS

Search Report and Written Opinion of the International Searching Authority (ISA/KR) for PCT/US2014/049505 dated Nov. 14, 2014.
(Continued)

*Primary Examiner* — Timothy L Maust
*Assistant Examiner* — James R Hakomaki
(74) *Attorney, Agent, or Firm* — Reising Ethington P.C.

(57) ABSTRACT

In at least some implementations, a device for filling a fuel gas storage tank includes a nozzle body having an inflow passage arranged to communicate a fuel gas source with the storage tank and an outflow passage arranged to receive an outflow of fuel gas from the storage tank. The inflow passage may be communicated with an inlet passage to admit fuel gas into the storage tank and the outflow passage may be communicated with an outlet passage through which fuel gas exits the storage tank. The outflow passage may be communicated with a downstream component for treatment of the outflow fuel gas, such as filtering, drying, and/or cooling. The outflow fuel gas may be rerouted into the fuel gas storage tank through the inflow passage and inlet pas-
(Continued)

sage, if desired. The disclosure also relates to a fitting for a storage tank and a method of filling a storage tank.

14 Claims, 3 Drawing Sheets

(51) Int. Cl.
 B01D 46/24 (2006.01)
 B01D 46/42 (2006.01)
 B01D 46/52 (2006.01)
 F02M 21/02 (2006.01)
 F17C 5/00 (2006.01)
 F17C 13/00 (2006.01)
 B60K 15/03 (2006.01)

(52) U.S. Cl.
 CPC ....... *B01D 46/4272* (2013.01); *B01D 46/521* (2013.01); *F02M 21/0227* (2013.01); *F17C 5/007* (2013.01); *F17C 11/005* (2013.01); *F17C 11/007* (2013.01); *F17C 13/00* (2013.01); *B60K 2015/03019* (2013.01); *F17C 2205/0376* (2013.01); *F17C 2221/012* (2013.01); *F17C 2221/033* (2013.01); *F17C 2223/0123* (2013.01); *F17C 2223/035* (2013.01); *F17C 2223/036* (2013.01); *F17C 2260/035* (2013.01); *Y02E 60/321* (2013.01); *Y02T 10/32* (2013.01)

(58) Field of Classification Search
 CPC ...... F17C 2205/0376; F17C 2223/0125; F17C 2223/036; F17C 2225/036; B01D 46/2403; B01D 46/4227; B01D 46/4272; F02M 21/0227; B05B 15/065; F16C 2223/0125
 USPC .................. 141/350, 1; 137/614.06, 614.11; 251/148, 149.5
 See application file for complete search history.

(56) References Cited

U.S. PATENT DOCUMENTS

| | | | | |
|---|---|---|---|---|
| 2,400,817 A * | 5/1946 | Fox | .......................... | F16N 21/04 137/539 |
| 2,675,829 A * | 4/1954 | Livers | .................... | F16L 37/133 137/614.06 |
| 2,727,759 A * | 12/1955 | Elliott | ..................... | F16L 29/02 137/614.04 |
| 2,784,987 A * | 3/1957 | Corcaran | .............. | F16B 7/0413 285/315 |
| 2,793,630 A * | 5/1957 | Halik | ........................ | F02D 1/08 123/364 |
| 3,020,819 A * | 2/1962 | Kunen | ................... | F24F 3/0522 137/898 |
| 3,234,965 A * | 2/1966 | Anderson | ............. | F16L 37/133 137/614.04 |
| 3,575,060 A * | 4/1971 | Warren | ................ | F16H 57/0498 74/425 |
| 4,195,812 A * | 4/1980 | Norcross | ................ | F16L 37/084 184/105.3 |
| 4,250,348 A * | 2/1981 | Kitagawa | ............... | H02G 3/065 174/652 |
| 5,035,271 A | 7/1991 | Carmack et al. | | |
| 5,095,947 A * | 3/1992 | Weh | ...................... | F16L 37/121 137/614.06 |
| 5,181,751 A * | 1/1993 | Kitamura | .............. | F16L 37/092 285/308 |
| 5,390,712 A | 2/1995 | Parrish et al. | | |
| 5,483,993 A * | 1/1996 | Roebelen, Jr. | .......... | F16L 37/28 137/614 |
| 5,834,662 A * | 11/1998 | Stoll | ........................ | B66C 23/84 74/425 |
| 6,039,303 A * | 3/2000 | Danielson | ........... | F16L 37/1215 137/614.03 |
| 6,478,343 B2 * | 11/2002 | King Lee | ............... | F16L 19/005 285/315 |
| 7,066,192 B1 * | 6/2006 | Delaney | ................ | F16K 31/055 137/15.18 |
| 7,793,914 B2 * | 9/2010 | Danielson | ........... | F16L 37/0848 251/149.6 |
| 9,147,963 B2 * | 9/2015 | Balcer | .................. | H01R 9/0524 |
| 2002/0121313 A1 | 9/2002 | Burns | | |
| 2006/0289084 A1 | 12/2006 | Groom et al. | | |
| 2008/0295916 A1 | 12/2008 | Bonner | | |
| 2012/0168028 A1 | 7/2012 | Eum | | |
| 2013/0061983 A1 | 3/2013 | Komiya et al. | | |

OTHER PUBLICATIONS

Extended European Search Report for application No. 14832166.4-1371 (PCT/US2014/049505); dated Jun. 1, 2017; 6 pages.

* cited by examiner

FUEL GAS TANK FILLING SYSTEM AND METHOD

CROSS-REFERENCE TO RELATED APPLICATIONS

This application claims the benefit of U.S. Provisional Application No. 61/861,467 filed on Aug. 2, 2013.

TECHNICAL FIELD

This disclosure relates generally to filling vehicle gas storage tanks with fuel gas and, more particularly, to a system and method for filling a fuel gas storage tank.

BACKGROUND

Alternative fuel gasses, such as natural gas and hydrogen, are promising alternatives to the traditional petroleum-based energy sources used in automotive vehicles. They are cleaner burning than petroleum-based gasoline and diesel, and are therefore better for the environment. Two prevailing technologies exist for storing such fuel gasses aboard a vehicle—in a compressed state or on a gas storage material. Compressed natural gas, for example, is stored at high pressure to less than 1% of the volume it would normally occupy at standard temperature and pressure. Natural gas can also be stored on a storage material (ANG storage material) in an adsorbed state. The allure of such ANG storage materials is that they can reversibly adsorb natural gas at an energy density comparable to compressed natural gas but at a much lower tank pressure.

Hydrogen gas, like natural gas, can also be stored in a compressed state or on a hydrogen storage material. Storing hydrogen gas on a hydrogen storage material has similar thermodynamics to storing natural gas on an ANG storage material even though hydrogen uptake is chemical in nature—hydrogen is stored as a hydride—as opposed to adsorptive. Hydrogen gas, for instance, can be reversibly charged and released from a hydrogen storage material such as, for example, a complex metal hydride including various known alanates, borohydrides, and amides. Some specific complex metal hydrides include sodium alanate ($NaAlH_4$), lithium alanate ($LiAlH_4$), lithium borohydride ($LiBH_4$) with or without $MgH_2$, calcium borohydride ($CaBH_4$) with or without $MgH_2$, and lithium amide ($LiNH_2$). MOFs and PPNs may also be used to store hydrogen gas. There are, of course, many other hydrogen storage materials that are commercially available.

While natural gas and hydrogen can be stored on their respective ANG and hydrogen storage materials at a lower pressure, compared to being stored in a compressed state, the time needed to fill a fuel gas tank that houses the storage material can be extensive since the natural gas adsorption and hydrogen uptake processes are exothermic and have a rate-limiting effect on further adsorption/uptake. Charging enough natural gas or hydrogen into a storage tank in direct contact with an appropriate gas storage material to provide a reasonable driving distance for a vehicle can take many hours to accomplish. Such long filling times may not always be acceptable or convenient for vehicle power applications.

SUMMARY

In at least some implementations, a device for filling a fuel gas storage tank includes a nozzle body having an inflow passage arranged to communicate a fuel gas source with the storage tank and an outflow passage arranged to receive an outflow of fuel gas from the storage tank. The inflow passage and outflow passage may be separate and may be defined within a common nozzle body. The inflow passage may be communicated with an inlet passage to admit fuel gas into the storage tank and the outflow passage may be communicated with an outlet passage through which fuel gas exits the storage tank. The outflow passage may be communicated with a downstream component for treatment of the outflow fuel gas, such as filtering, drying, and/or cooling. The outflow fuel gas may then be rerouted into the storage tank through the inflow passage and inlet passage, if desired.

A fitting for a fuel gas storage tank is also disclosed. The fitting may include a body defining at least part of an inlet passage through which fuel gas is admitted into the storage tank and at least part of an outlet passage from which fuel gas exits the storage tank. The inlet passage may be separate from the outlet passage within the body. Fuel gas may be admitted into the storage tank through the inlet passage and fuel gas may exit the storage tank through the outlet passage.

A method of filling a fuel gas storage tank may be accomplished by fluidly coupling a refueling nozzle to the storage tank, providing a flow of fuel gas, such as natural gas or hydrogen, into the storage tank through the refueling nozzle, and permitting a flow of fuel gas out of the storage tank through the refueling nozzle. The fuel gas leaving the storage tank may be at an elevated temperature and removing this heated fuel gas may facilitate quicker adsorption/uptake of additional fuel gas within the storage tank. The removed, heated fuel gas may be treated outside of the storage tank and returned, if desired, to the storage tank.

DETAILED DESCRIPTION

The system and methods of filling a fuel gas storage tank described below enable the use of a conformable fuel gas storage tank that stores adsorbed natural gas (ANG) or hydrogen gas, as a hydride, at a relatively low pressure. The conformable fuel gas tank includes an ANG storage material or a hydrogen storage material which permits natural gas or hydrogen gas, respectively, to be stored at an energy density comparable to that of those same gasses in a compressed state, but at lower tank pressure. The following system and methods are useful to lessen or minimize the time required to fill a fuel gas storage tank by permitting, during a refueling event in which fuel gas is provided into the gas storage tank, an outflow of fuel gas from the gas storage tank that may be at an increased temperature. The outflow fuel gas can be cooled and then returned to the tank to facilitate quicker adsorption/uptake within the fuel gas storage tank.

Figure 1:
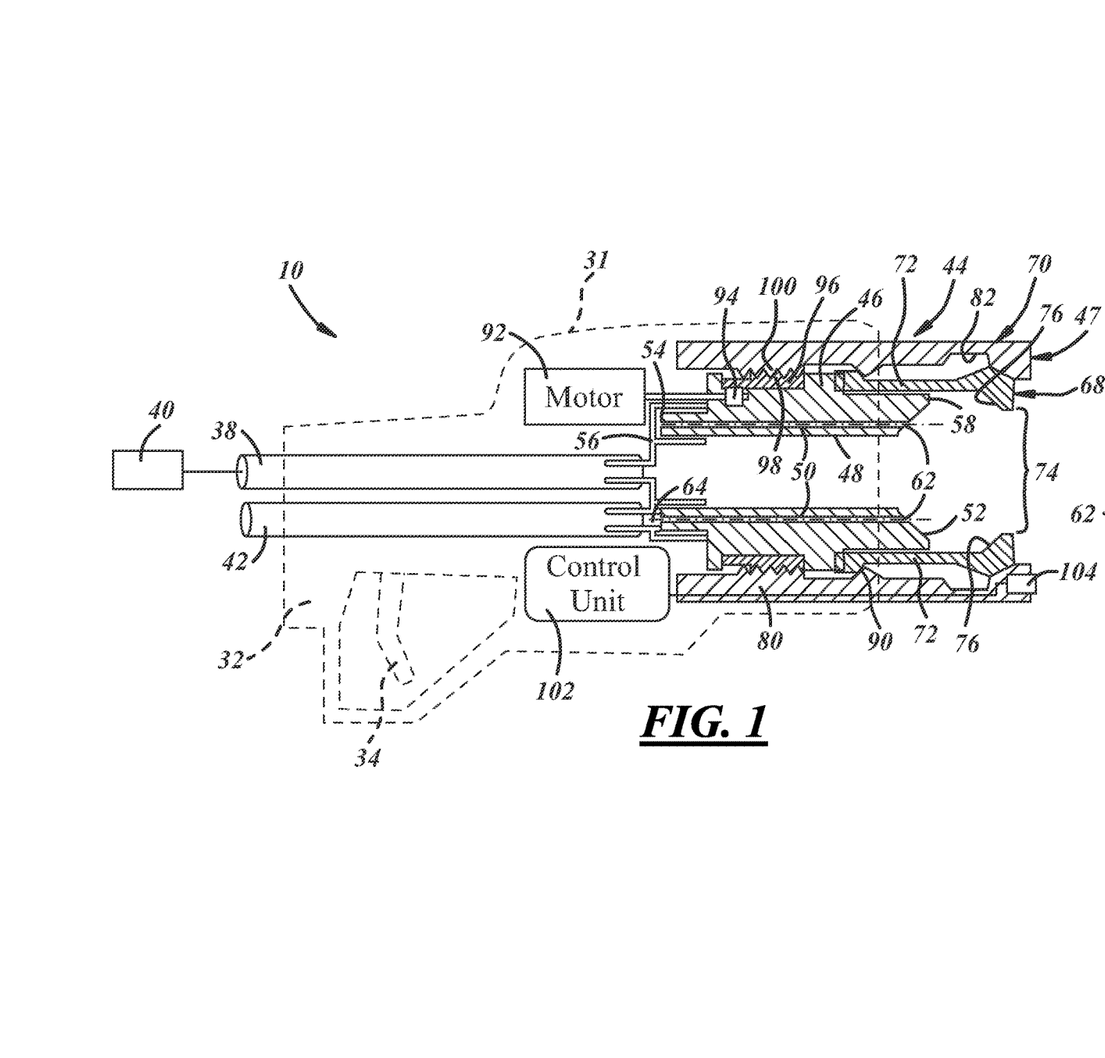
FIG. 1 is a schematic view of a refueling nozzle through which fuel gas may be provided to a storage tank.
Figure 2:
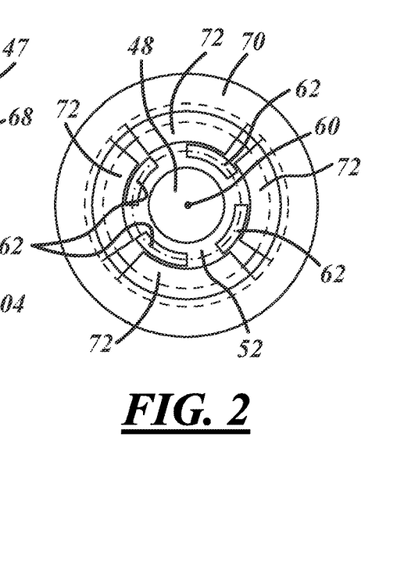
FIG. 2 is an end view of the refueling nozzle of FIG. 1.

Referring in more detail to the drawings, FIGS. 1 and 2 illustrate one implementation of a refueling gun or nozzle 10 that may be used to fill a fuel gas storage tank 11 (shown diagrammatically in FIG. 8), which will be described moving forward in the context of refueling a natural gas storage tank that houses an ANG storage material for adsorptively storing natural gas. Natural gas, as is generally well known, is a combustible fuel whose largest constituent is methane ($CH_4$). The preferred type of natural gas used here is refined natural gas that includes 90 wt. % or greater, and preferably 95 wt. % or greater, methane with the remaining 5 wt. % or less typically being varying amounts of natural impurities—such as higher molecular weight alkanes, carbon dioxide, and nitrogen—and/or added impurities. The refueling nozzle 10, as shown, is constructed to communicate with an inlet and an outlet of the storage tank 11 that are located adjacent to each other, such as in a common port, fitting, or connector of the storage tank 11. While the following description of preferred exemplary embodiments is described in the context of natural gas and vehicle gas storage tanks equipped to store ANG, those skilled in the art will nonetheless understand and recognize that the following teachings are also applicable in the context of hydrogen gas and vehicle gas storage tanks equipped to store hydrogen gas.

Figure 3:
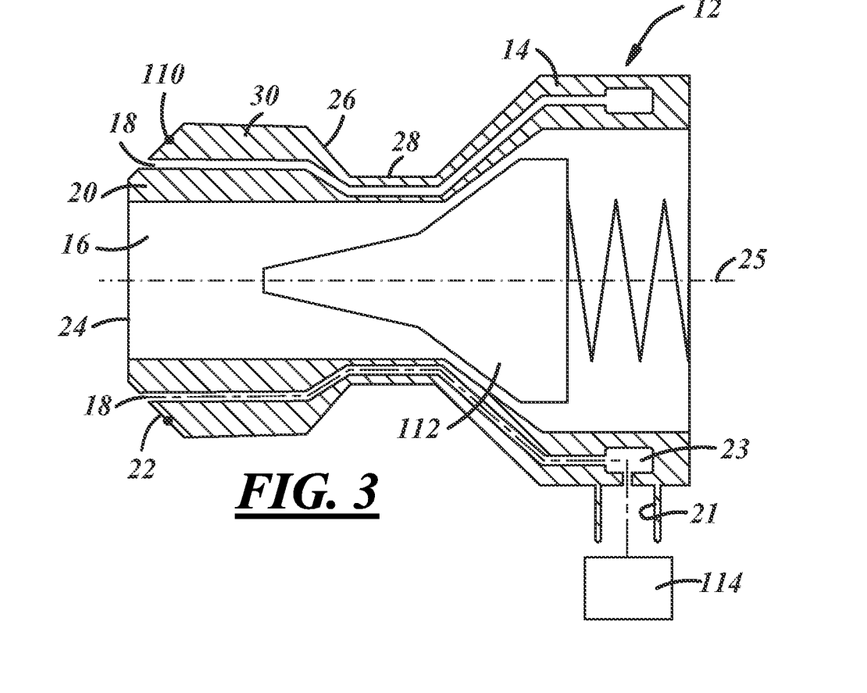
FIG. 3 is a schematic side sectional view of an end of a fitting for a fuel gas storage tank.
Figure 4:
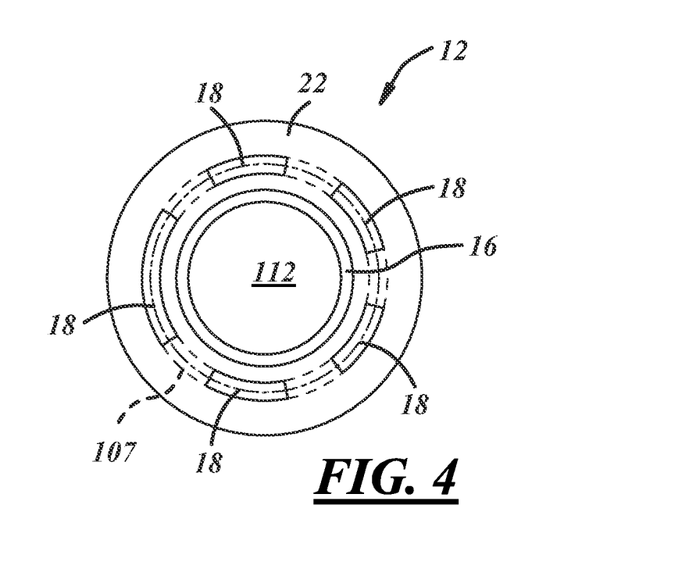
FIG. 4 is an end view of the fitting of FIG. 3.

One example of a storage tank fitting 12 is shown in FIGS. 3 and 4, which may be defined in or on a fill pipe 14, or attached to an end thereof, or supported directly on the ANG storage tank 11. The fitting 12 has one or more inlets and one or more outlets fluidly communicating with an interior of the tank 11. The inlet may include a central inlet passage 16 in the fill pipe 14 and the outlet may include or be defined in one or more separate passages 18. In the implementation shown, the outlet passages 18 are provided in a side wall 20 of the fill pipe 14, radially outwardly spaced from the inlet passage 16. Multiple outlet passages 18 may be provided and they may be maintained separately from each other within the fill pipe 14 or they may be open and communicated with each other (e.g. by a groove or cavity spanning between passages) within the boundaries or extent of the fill pipe 14, as desired. A port 21 may communicate the tank interior with the outlet passages 18, which branch off of a cavity 23, as shown in FIG. 3. Of course, other arrangements are possible, including but not limited to, the inlet and outlet passages 16, 18 being reversed. For example, without limitation, the outlet could be defined in a tube separate from the inlet and that tube may be spaced from or connected to the inlet tube. The inlet and outlet passages 16, 18 may be provided in the fill pipe 14 in any desired manner, such as, but not limited to, drilling or some other operation after the fill pipe is formed or by forming the passages as the fill pipe is molded or cast, as desired. One or more of each of the inlet and outlet passages 16, 18 may be provided and for ease of further description, the passages 16, 18 will be referred to as single passages in many instances in this document.

The fill pipe 14 may include a contact surface 22 at or near an axial free end 24 of the fill pipe 14. The contact surface 22 may be inclined to facilitate coaxial alignment with the refueling nozzle 10. The contact surface 22 may be circumferentially continuous (relative to an axis 25 of the fill pipe 14) and the outlet passages 18 may extend into and be open to the contact surface 22. The contact surface 22 may also surround and be defined in part by the inlet passage 16. Axially spaced from the contact surface 22, the fill pipe 14 may include an engagement surface 26 adapted to be engaged by another component to facilitate holding the refueling nozzle 10 onto the fill pipe 14, as will be set forth below. The engagement surface 26 may be circumferentially continuous and defined in part by a reduced diameter neck 28, with a head 30 being defined between the neck 28 and the contact surface 22.

The refueling nozzle 10 may include multiple gas flow paths or passages to provide natural gas into the ANG storage tank 11 through the fill pipe inlet passage 16 and permit natural gas to be returned from the ANG storage tank 11 through the fill pipe outlet passage 18, as will be set forth in more detail below. The refueling nozzle 10, as shown in FIG. 1, may be selectively mated with the fill pipe 14 and include a housing 31 with a handle 32 that may be grasped by a user to facilitate connecting the refueling nozzle 10 to the fill pipe 14. The handle 32 may include a trigger 34 or lever that may be manipulated to permit user control of the storage tank filling process. An inlet conduit 38 communicates with a natural gas source 40 and may extend into and be carried by the housing 31. An outlet conduit 42 may define part of an outflow path for natural gas exiting the ANG storage tank 11 and may also extend into and be carried by the housing 31. To facilitate mating with the fill pipe 14, a fill pipe coupler 44 may be carried by the housing 31. The coupler 44 may provide an interface between inlet and outlet conduits 38, 42 and the fill pipe 14. In more detail, the coupler 44 may position and retain the refueling nozzle 10 on the fill pipe 14, communicate the inlet conduit 38 with the fill pipe inlet passage 16, and communicate the outlet conduit 42 with the fill pipe outlet passage 18. The coupler 44 may include a nozzle body 46 and a retaining assembly 47 that releasably retains the refueling nozzle 10 coupled to the fill pipe 14 during the tank filling process.

The nozzle body 46 may include any component adapted to be mated to the fill pipe 14 to permit the inflow and outflow of natural gas through the fill pipe 14 and refueling nozzle 10. In the implementation shown, the nozzle body 46 is tubular with an inflow passage 48 adapted to communicate with the fill pipe inlet passage 16 and an outflow passage 50 adapted to communicate with the fill pipe outlet passage 18. The inflow and outflow passages 48, 50 may be defined by or include multiple passages. For ease of description, all passages permitting natural gas flow to the ANG storage tank 11 will collectively be referred to as the inflow passage 48 and all passages permitting gas flow out of the storage tank will collectively be referred to as the outflow passage 50.

The nozzle body 46 may also include a sealing surface 52 adapted to engage the fill pipe 14 and a trailing end 54 that may be coupled to the inlet and outlet conduits 38, 42, such as by an adapter 56 that may be welded, adhered, threaded, or otherwise carried by or connected to the nozzle body 46. The sealing surface 52 may include an inclined surface that may be provided at or near an axial outer end 58 of the nozzle body 46 (where the defined axis is a central axis 60 (FIGS. 2 and 5) of the nozzle body 46) and at a complementary angle to the fill pipe contact surface 22 to facilitate alignment and sealing of the nozzle body 46 with the fill pipe 14. While shown as being inclined from the axial outer end 58 radially inwardly and axially toward the trailing end 54 of the nozzle body 46, the incline of the sealing surface 52 could be reversed or otherwise arranged.

Figure 7:
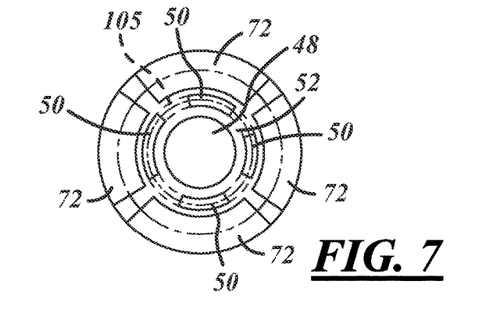
FIG. 7 is a right end view of the refueling nozzle portion shown in FIG. 5 with an actuator removed.

The sealing surface 52 may be circumferentially continuous and radially surround the inflow passage 48, as shown in FIGS. 1, 2 and 5-8. The outflow passage 50 may extend to and through the sealing surface 52 presenting open slots or ports 62 of the outflow passage 50 at the sealing surface 52. In the implementation shown, four inlet ports 62 of the outflow passage 50 are provided at the sealing surface 52, as shown in FIGS. 2 and 7, and these ports 62 may converge within the nozzle body 46 or in a gap between the adapter 56 and nozzle body 46 and exit through a single outlet port 64 in the adapter 56 leading to the outlet conduit 42. Of course, other port and passage arrangements may be utilized, as desired. Like the fill pipe passages 16, 18, the ports 62 and passages 48, 50 may be formed in any desired manner, such as by being drilled, or by forming the passages during molding or casting, as desired.

To retain and sealingly couple the refueling nozzle 10 on the fill pipe 14, the retaining assembly 47 provides a secure, reliable retention of the refueling nozzle 10 on the fill pipe 14 to enable sealed natural gas inflow into, and outflow from, the ANG storage tank 11. In the example shown, the retaining assembly 47 includes a movable retainer 68, which in at least some implementations may expand and contract, and an actuator 70 that controls movement of the retainer 68.

Figure 5:
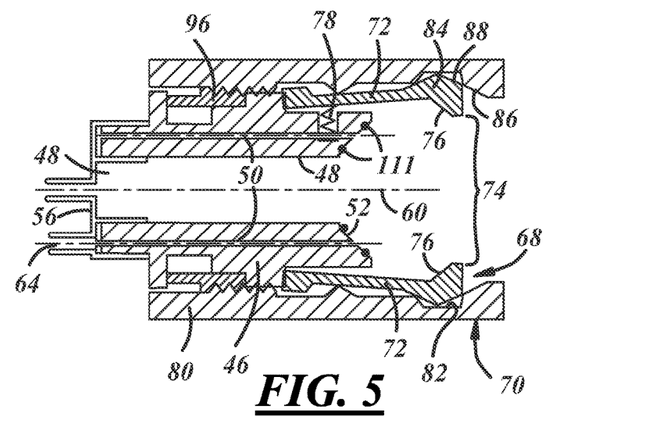
FIG. 5 is a schematic side sectional view of a portion of the refueling nozzle.
Figure 6:
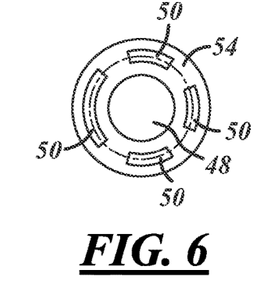
FIG. 6 is a left end view of the refueling nozzle portion shown in FIG. 5.
Figure 8:
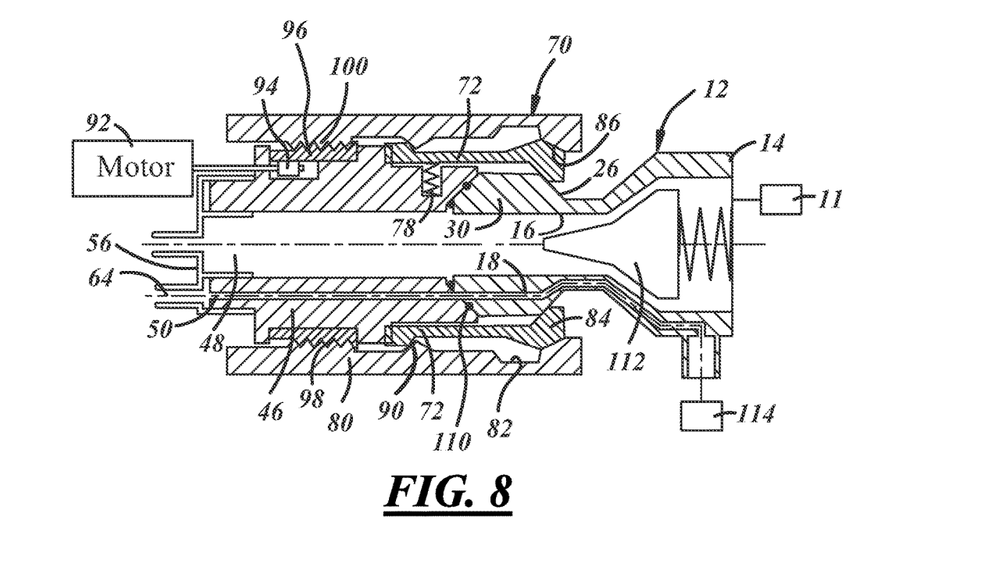
FIG. 8 is a schematic side sectional view of a refueling nozzle mated with a fitting.

The retainer 68, in one form as shown in the drawings, includes multiple segments 72. Portions of the segments 72 move radially relative to the nozzle body 46. When the segments 72 are in a first position, they are outwardly retracted relative to the nozzle body 46, as shown in FIG. 5. In this first position, an opening 74 defined between the segments 72 is large enough to receive the axial free end 24 of the fill pipe 14. And when the segments 72 are inwardly advanced to a second position, as shown in FIGS. 1 and 8, the opening 74 between the segments 72 is smaller than a portion of the fill pipe 14 (e.g. the head 30) to hold the refueling nozzle 10 on the fill pipe 14. In more detail, in the implementation shown, the segments 72 include a retaining surface 76 that, when the segments 72 are inwardly advanced in their second positions, engages the engagement surface 26 on the fill pipe 14. To firmly hold the refueling nozzle 10 against the fill pipe 14, the retaining and engagement surfaces 76, 26 may be similarly tapered to provide a camming action of the segments 72 against the fill pipe 14 to pull the refueling nozzle 10 tight against the fill pipe 14 as the segments 72 are inwardly advanced and the retaining surfaces 76 slidably contact the engagement surface 26. The retainer segments 72 may be yieldably biased to their first, retracted position by one or more springs 78 (FIGS. 5 and 8), which may be provided between the nozzle body 46 and the segments 72.

To selectively displace the segments 72 to their second positions when the refueling nozzle 10 is positioned adjacent to the fill pipe 14, the actuator 70 may be moved from a first position permitting outward movement of the segments 72 (shown in FIG. 5) to a second position in which the segments 72 are displaced to or toward their second positions (shown in FIGS. 1 and 8). In the implementation shown, the actuator 70 includes a tubular sleeve 80 located radially outwardly of the segments 72 and the nozzle body 46. The sleeve 80 includes a recess 82 providing a larger inner diameter portion of the sleeve 80. In the first position of the actuator 70, shown in FIG. 5, the recess 82 is aligned with a radially outwardly extending portion 84 of the segments 72 and movement of the segments 72 under the force of the spring(s) 78 to or toward their first positions is accommodated by the recess 82. When the actuator 70 is displaced from its first position toward its second position, the recess 82 is moved out of registry with the portion 84 of the segments 72 and a cam surface 86 of the sleeve 80 engages a drive surface 88 of the segments 72 and displaces the segments 72 inwardly against the force of the spring(s) 78. The cam surface 86 and drive surfaces 88 may be inclined or tapered to provide increasing displacement of the segments 72 with increasing displacement of the actuator 70. One or more segments 72 and the actuator 70 may include mating stop surfaces 90 (FIGS. 1 and 8) that limit movement of the actuator 70 toward its second position.

The actuator 70 may be moved manually or by a powered drive between its first and second positions, and relative to the segments 72. Representative powered drives include pneumatic or hydraulic drives, or an electric motor. In the implementation shown, a motor 92 is coupled to the actuator 70 by a link which is shown as including a worm drive having a worm 94 driven by the motor 92 and coupled to a worm gear 96. The worm gear 96 may be tubular and carried by or formed in the nozzle body 46 surrounding a portion of the nozzle body 46. The worm gear 96 may have internal teeth engaged with the worm 94 and external teeth 98 engaged with teeth 100 on or associated with the actuator 70. When the worm 94 is rotated by the motor 92, the worm gear 96 is rotated and, in turn, rotates the actuator 70 and thereby axially moves the actuator 70 between its first and second positions. Of course, a rack and pinion drive or any other suitable drive may be used to drive the actuator 70 between its first and second positions, and the actuator 70 need not rotate as it moves, it may slide axially without rotating, if desired.

The motor 92 may be communicated with and controlled by a control unit 102 (FIG. 1) that may provide only that function or multiple functions, as desired. Some other functions that may be provided by the control unit 102 include monitoring system pressures, temperature, gas flow rates, motor torque, sealing pressure, and/or positions of the actuator 70, segments 72 or other system components, to name a few. The coupler 44 may also include or be associated with a sensor 104 that detects the type of storage tank the refueling nozzle 10 is coupled to, or may sense some other condition, such as a leak of gas to the atmosphere. In this regard, the ANG storage tank 11 or fill pipe 14 may include a transmitter or complementary sensor that is detected by the coupler sensor 104 to provide a signal to the control unit 102 (or other controller) indicative of the type of storage tank in use. The information may be used to control operational characteristics of the refueling nozzle 10 to maintain the temperature, pressure or other characteristics within design thresholds.

To connect the refueling nozzle 10 to the fill pipe 14 to transfer natural gas into the storage tank 11 via the fill pipe 14 and refueling nozzle 10, the refueling nozzle 10 is moved into position near the fill pipe 14 with the coupler 44 adjacent to the axial free end 24 of the fill pipe 14. The refueling nozzle 10 may be in the position shown in FIG. 5, in which the actuator 70 is in its first position and the retainer segments 72 are radially outwardly displaced by the springs 78. In this position, the opening 74 between the segments is large enough to receive the head 30 of the fill pipe 14. The refueling nozzle 10 is positioned over the head 30 of the fill pipe 14 and advanced until the contact surface 22 of the fill pipe 14 is adjacent to and contacts the sealing surface 52 of the nozzle body 46. The actuator 70 is then moved from its first position to its second position engaging the cam surface 86 of the actuator 70 with the drive surfaces 88 of the segments 72 and displacing the free end of each segment 72 radially inwardly. This engages the retaining surface 76 of the segments 72 with the engagement surface 26 of the fill pipe 14 to trap the fill pipe head 30 and securely hold the refueling nozzle 10 against the fill pipe 14. In this position, a portion of the fill pipe 14 (e.g. the head 30) is trapped between the retainer 68 and the nozzle body 46.

Also in this position, the fill pipe inlet passage 16 is aligned with the inflow passage 48 in the nozzle body 46, and the fill pipe outlet passage 18 is aligned with the outflow passage 50 in the nozzle body 46. To facilitate this, multiple outflow passages 48 may be communicated via a groove 105 or cavity in the nozzle body 46, and likewise, multiple outlet passages may also be communicated by a groove 107 or cavity in the fill pipe. Only a portion of the grooves 105, 107 or cavities would then need to be aligned to permit gas flow between the fill pipe 14 and nozzle body 46. The groove 105 may extend circumferentially around part or all of the sealing surface 52 of the nozzle body 46, and the same may be true for the groove 107 in the fill pipe contact surface 22. The grooves 105, 107 are shown in dashed lines in FIGS. 4 and 7.

As shown in FIGS. 3 and 8, the contact surface 22 of the fill pipe 14 may include a seal 110, which may be formed of any suitable material and in any suitable shape. One example seal 110 is an o-ring carried by the fill pipe 14, such as within a groove in the contact surface 22. The seal 110 is shown as being disposed at least radially outwardly of the outlet passage 18. Gas that leaks in the opposite direction would join the gas flow from the inflow passage 48 and be returned to the storage tank 11. If such leakage is not desired, it may be inhibited or prevented by the addition of one or more seals located between the inlet and outlet passages 16, 18. Seals 111 in addition to, or instead of, the seals noted with regard to the fill pipe 14 could be carried by the nozzle body 46 in the sealing surface 52 as shown in FIG. 5.

With the refueling nozzle 10 engaged and sealed to the fill pipe 14, valves in or associated with one or both of the refueling nozzle 10 and the fill pipe 14 may be opened to permit natural gas flow into the ANG storage tank 11 via the refueling nozzle inflow passage 48 and the fill pipe inlet passage 16, and out of the storage tank 11 through the fill pipe outlet passage 18 and the refueling nozzle outflow passage 50. Representative inlet and outlet valves 112, 114 may be provided in the fill pipe 14 as shown in FIGS. 3-4 and 8, and may open upon application of gas at a pressure above a threshold acting on the inlet valve 112 that selectively closes the fill pipe inlet passage 16. The outlet valve 114 that selectively closes the fill pipe outlet passage 18 may be coupled to the inlet valve 112 for movement therewith, or may be responsive to opening of the inlet valve 112 to permit outflow from the ANG storage tank 11 through the outlet passage 18 when desired. The inlet and outlet valves 112, 114 may also be controlled by a control unit of the vehicle or associated with the refueling nozzle 10 or elsewhere to control the flow of natural gas into and out of the ANG storage tank 11 as desired. Natural gas is delivered into the inflow passage 48 from the inlet conduit 38 and natural gas flows out of the refueling nozzle outflow passage 50 to the outlet conduit 42. From the outlet conduit 42, the outflow of natural gas may be provided to a downstream component for filtering, storage, and/or temperature control.

As previously noted, the adsorption process of natural gas in the ANG storage tank 11 is exothermic. The outflow of natural gas is often at an elevated temperature, and in one representative process, the outflow natural gas temperature is reduced in a heat exchanger and then the outflow gas is returned to the ANG storage tank 11 through the inlet conduit 38 and inflow passage 48. Hence, a desired outflow of heated natural gas and return to the ANG storage tank 11 of cooler natural gas limits or reduces the temperature within the storage tank 11 and facilitates adsorption and filling of the storage tank 11. This permits the ANG storage tank 11 to be filled in less time.

As shown and described, the two directional natural gas flow may occur through a single refueling nozzle 10, with a single connection to the ANG storage tank 11 to reduce complexity and the time needed to connect a refueling nozzle to a tank. Of course, separate connectors may be used for the inflow and outflow gas, as desired, and/or multiple inflow or outflow passages (and inlet and outlet passages) may be provided to the storage tank.

If desired, the trigger 34 or other button, lever, or actuator, may be manipulated by a user desiring to fill the ANG storage tank 11 to initiate one or both of the actuator movement to lock and seal the refueling nozzle 10 to the fill pipe 14 and the flow of natural gas through the refueling nozzle 10. For example, the trigger 34 may be actuated a first time, or displaced to a first/intermediate position to actuate the motor 92 that drives the actuator 70 from its first position to its second position. This locks and seals the refueling nozzle 10 to the fill pipe 14. Upon completion of that step, natural gas flow may automatically start when a suitable seal is verified, or further actuation of the trigger 34 (e.g. to a final position, or a second actuation of the trigger) may cause natural gas to flow through the refueling nozzle 10. This may facilitate user controlled sealing and fueling, with confirmation of sealing and other safeguards provided via suitable sensors and/or controllers. One sensor may determine the position of the actuator 70 and/or the retainer 68, and the flow of natural gas may be prevented until the actuator and/or retainer are in their second positions indicative of a sufficient lock and seal of the refueling nozzle 10 on the fill pipe 14. Of course, other arrangements and systems may be used to inhibit or prevent natural gas flow prior to a suitable seal being developed between the refueling nozzle 10 and fill pipe 14.

When it is desired to terminate the refueling operation, the natural gas flow is terminated. This may be done by manipulating the trigger 34, or some other device (e.g. pushing a stop button or the like). Where the trigger 34 is manipulated, it may be released, or actuated an additional time to stop the flow of natural gas, and perhaps yet again to cause the actuator 70 to be moved from its second position back to its first position to permit the retainer segments 72 to move away from the fill pipe 14. Of course, the actuator 70 may be moved automatically upon the termination of natural gas flow, or by a controller, as desired. When the retainer segments 72 clear the fill pipe 14, the refueling nozzle 10 may be removed from the fill pipe 14 to end the refueling operation. The inlet and outlet valves 112, 114 are closed, and a cap, if one is used, may be provided on the fill pipe 14.

While the nozzle body 46 is shown and described as being a one-piece component that defines two flow paths or passages 48, 50 (e.g. inflow and outflow), the nozzle body 46 could be formed from more than one-piece of material and, for example, the inflow and outflow passages could be defined in separate components or pieces of material. It may be advantageous when a multi-piece nozzle body is used, to enable simultaneous connection of both flow paths to the ANG storage tank 11, although this is not required. Separate retainers 68 and/or actuators 70 may be used for each piece in a multi-piece nozzle body arrangement, or one retainer and/or one actuator may be used if desired. The inflow and outflow paths 48, 50 may be concentric, or they may be radially offset from each other, as desired. One flow path may be located radially within the other path, or the paths could be independent and separate.

During a filling event, such as a closed-loop filing procedure, natural gas is delivered to the inlet conduit 38 of the refueling nozzle 10 from a natural gas source 40. The natural gas supplied by the natural gas source 40 plus any natural gas returning from treatment as supplied by the outflow passage 50 (e.g. cooling from a heat exchanger) provides an inflow of natural gas that is fed to the ANG storage tank 11. The natural gas source 40 is preferably a tapped residential or commercial gas distribution network or a large underground storage tank that supplies natural gas at a pressure ranging from about 1 bar to about 50 bar. It is also possible, as another example, for the natural gas source 40 to be a compressed natural gas tank that stores natural gas at a pressure greater than 200 bar. The compressed natural gas tank may be outfitted with a Joule-Thompson valve and an expansion tank that, together, throttle the CNG to a lower pressure of about 1 bar to about 50 bar for delivery to the filling system 10. Still further, the natural gas source 40 could be a cryogenic tank that holds liquefied natural gas at a pressure of up to about 2 bar. A heat exchanger may be used in conjunction with the cryogenic tank to evaporate the liquefied natural gas for delivery to the filling system 10.

The exothermic nature of the adsorption process can limit the rate of natural gas adsorption and the amount of natural gas adsorbed within the ANG storage tank 11. This is because the heat generated by the adsorption process can raise the temperature of the ANG storage material which, in turn, works to desorb some of the natural gas. In other words, as the ANG storage material in the tank 11 increases in temperature during adsorption, the rate at which natural gas is adsorbed is reduced (i.e., the difference between the competing rates of natural gas adsorption and desorption converge as the temperature of the ANG storage material increases) unless the heat produced by the adsorption process can be rejected. In one form, this is accomplished by circulating a flow of natural gas through the ANG storage tank 11 such that hotter gas is removed through the outlet and outflow passages 18, 50 for cooling prior to being rerouted back into the storage tank 11. The removal of generated heat from the ANG storage tank 11 helps to consistently maintain a higher natural gas adsorption rate during the filling event.

The above description of preferred exemplary embodiments and related examples are merely descriptive in nature; they are not intended to limit the scope of the claims that follow. Each of the terms used in the appended claims should be given its ordinary and customary meaning unless specifically and unambiguously stated otherwise in the specification.

The invention claimed is:

1. A refueling nozzle for filling a fuel gas storage tank, comprising:
   a housing and a fill pipe coupler carried by the housing to facilitate mating with a fill pipe of a fuel gas storage tank, the coupler of the refueling nozzle further comprising:
      a nozzle body having an inflow passage arranged to communicate a fuel gas source with the storage tank and a separate outflow passage arranged to receive an outflow of fuel gas from the storage tank;
      a retainer including multiple radially outwardly biased segments that are movable radially relative to the nozzle body between a first position in which the multiple segments are outwardly retracted relative to the nozzle body to permit the nozzle body to be coupled to or released from the fill pipe of the storage tank and a second position in which the multiple segments are radially inwardly advanced to releasably retain the nozzle body in engagement with the fill pipe of the storage tank, each of the multiple segments of the retainer comprising a radially outwardly extending portion having a drive surface; and
      an actuator including a tubular sleeve located radially outwardly of the retainer and the nozzle body, the actuator comprising a recess that provides a larger inner diameter portion of the sleeve and being axially movable between a first position and a second position, wherein the radially outwardly extending portion of the multiple segments of the retainer are registered with the recess of the actuator and the multiple segments are radially outwardly biased to their first position when the actuator is in its first position, and wherein the radially outwardly extending portion of the multiple segments of the retainer are out of registry with the recess of the actuator and the multiple segments are displaced radially inwardly to their second position when the actuator is in its second position.

2. The refueling nozzle as set forth in claim 1, further comprising a motor coupled to the actuator to move the actuator relative to the retainer and thereby move the multiple segments of the retainer from their first position to their second position.

3. The refueling nozzle as set forth in claim 2, further comprising a worm drive coupled to the motor and the actuator to axially move the actuator relative to the retainer.

4. The refueling nozzle as set forth in claim 1, wherein the actuator includes a cam surface that engages and displaces a drive surface of each of the multiple segments of the retainer to displace the segments radially inwardly to their second position when the actuator is in its second position.

5. The refueling nozzle as set forth in claim 1, wherein the nozzle body has a tubular sidewall, at least part of one of the inflow passage or the outflow passage is defined by the sidewall radially inwardly of the sidewall and the other of the inflow passage or the outflow passage is defined at least partially within the sidewall, radially outwardly spaced from the other passage.

6. The refueling nozzle as set forth in claim 5, wherein the inflow passage is radially inwardly of the sidewall and the outflow passage is defined at least partially within the sidewall.

7. The refueling nozzle as set forth in claim 5, wherein multiple outflow passages are defined at least partially in the sidewall.

8. The refueling nozzle as set forth in claim 1, wherein the nozzle body includes a sealing surface adapted to engage the storage tank and at least one of the inflow or the outflow passage is open to the sealing surface.

9. A method of filling a fuel gas storage tank using the refueling nozzle set forth in claim 1, the method comprising:
   coupling the fill pipe coupler of the refueling nozzle to the fill pipe of fuel gas storage tank, the fill pipe having a side wall that defines an inlet passage and an outlet passage separate from the inlet passage, and, wherein, upon coupling of the fill pipe coupler to the fill pipe, the inflow passage of the nozzle body communicates with the inlet passage of the fill pipe and the outflow passage of the nozzle body communicates with the outlet passage of the fill pipe, wherein the step of coupling the refueling nozzle to the storage tank further comprises:
      moving the actuator relative to the retainer to the first position of the actuator so that the multiple segments of the retainer are radially outwardly retracted to their first position;
      receiving the fill pipe of the fuel gas storage tank within an opening defined by the multiple segments of the retainer when the multiple segments of the retainer are in their first position, the fill pipe having a head that includes an axial free end of the fill pipe and a reduced diameter neck behind the head; and moving the actuator relative to the retainer to the second position of the actuator so that the multiple segments of the retainer are radially inwardly advanced to engage an engagement surface within the reduced diameter neck of the fill pipe to hold the refueling nozzle on the fill pipe;

providing a flow of fuel gas into the fuel gas storage tank through the refueling nozzle; and permitting a flow of fuel gas out of the storage tank through the refueling nozzle while at the same time providing a flow of fuel gas into the fuel gas storage tank.

10. The method set forth in claim 9, wherein the side wall is tubular and either the inlet passage or the outlet passage is formed in the side wall and the other of the inlet passage and the outlet passage is centrally located radially inwardly of the side wall.

11. The method as set forth in claim 9, wherein the step of coupling the fill pipe coupler of the refueling nozzle to the fill pipe of the fuel gas storage tank releasably seals the refueling nozzle to the fill pipe of a portion of the storage tank.

12. The method as set forth in claim 9, wherein each of the multiple segments of the retainer includes a tapered surface that engages the engagement surface of the fill pipe.

13. The method as set forth in claim 9, wherein the fuel gas is natural gas or hydrogen.

14. A refueling nozzle for filling a fuel gas storage tank, comprising:

a housing and a fill pipe coupler carried by the housing to facilitate mating with a fill pipe of a fuel gas storage tank, the coupler of the refueling nozzle further comprising:

a nozzle body having a tubular sidewall extending between an outer axial end and a trailing end and further defining an inflow passage and a separate outflow passage, the outer axial end of the nozzle body sidewall having a sealing surface and the trailing end being connected to an adapter that fluidly communicates a fuel gas inlet conduit with the fuel gas inflow passage and a fuel gas outlet conduit with the fuel gas outflow passage, and wherein the sealing surface of the outer axial end of the nozzle body sidewall circumferentially surrounds one of the fuel gas inflow passage or the fuel gas outflow passage and the other of the fuel gas inflow passage or the fuel gas outflow passage extends through and is open at the sealing surface of the nozzle body sidewall;

a retainer including multiple segments that are movable radially relative to the nozzle body between a first position in which the multiple segments are outwardly retracted relative to the nozzle body to permit the nozzle body to be coupled to or released from the fill pipe of the storage tank and a second position in which the multiple segments are radially inwardly advanced to releasably retain the nozzle body in engagement with the fill pipe of the storage tank; and an actuator including a tubular sleeve located radially outwardly of the retainer and the nozzle body, the actuator being movable over the retainer between a first position and a second position to move the multiple segments of the retainer between their first position and second position, respectively, and wherein the tubular sleeve of the actuator includes a cam surface that engages a tapered drive surface of the multiple segments of the retainer to inwardly advance the multiple segments to their second position when the actuator is moved to its second position.

* * * * *